3,482,965
PROCESS FOR DE-COPPERISING LEAD
Geoffrey Milner, Stockton-on-Tees, England, assignor to The Power-Gas Corporation Limited, Stockton-on-Tees, England
No Drawing. Filed Apr. 29, 1965, Ser. No. 451,964
Claims priority, application Great Britain, July 17, 1964, 29,239/64
Int. Cl. C22b 13/06
U.S. Cl. 75—78    2 Claims The present invention relates to a process for de-copperising lead and particularly to the de-copperising of lead bullion of a relatively high copper content.

When molten raw lead bullion is cooled copper is precipitated from solution and combines with impurities present such as sulphur, arsenic and antimony to form cuprous sulphide, copper arsenide and a copper-antimony compound respectively, which separate in a dross formed at the surface of the bullion. The dross contains a substantial proportion of entrained lead bullion which becomes coated with lead oxide.

In the established method of de-copperising lead by drossing, hot molten raw lead bullion is run into a drossing kettle until the kettle is full to its working capacity, the bullion is allowed to cool and the dross which is formed at the surface is skimmed off. In the final stage of copper removal, which may be carried out in a second drossing kettle, the bullion is maintained at a temperature just above its freezing point and elemental sulphur in granular form is stirred into the molten bullion. A dross containing cuprous sulphide is formed and is skimmed off, and the remaining bullion is of low copper content.

The established method of de-copperising lead by drossing is readily applicable to bullions containing up to 2% by weight of copper. When the copper content of the bullion exceeds about 3% by weight, and when impurities such as sulphur, arsenic and antimony are together less than that required to form compounds with copper, said established method becomes progressively more difficult and especially so when the copper content is 5% by weight or higher. This is because when the copper content of the bullion is relatively high and when there are not sufficient impurities such as sulphur, arsenic and antimony present to combine with all of the copper in the bullion, on cooling the hot bullion the excess copper separates in metallic form and appears in the dross as a colloidal suspension in a large portion of lead. The dross which is skimmed off may contain less than 10% by weight of equivalent copper, so that more than half of the weight of the raw bullion will be removed as dross. The separation and subsequent treatment of such a large quantity of dross is unattractive, because of the arduous manual labour involved, the high cost of fuel and the auxilliary equipment required.

According to the present invention a process for de-copperising lead of a relatively high copper content comprises mixing a predetermined quantity of hot molten raw lead bullion with a predetermined quantity of de-copperised lead bullion contained in a vessel, such as a drossing kettle, then adding to and mixing with the bullion contained in said vessel material containing an element or elements which can combine with copper as a compound or compounds, cooling the mixed bullion, then periodically adding further predetermined quantities of hot molten raw bullion to said vessel to mix with the bullion contained therein until the vessel is full to its working capacity, with each such addition adding to and mixing with the bullion contained in said vessel material containing an element or elements which can combine with copper as a compound or compounds, cooling the mixed bullion before the next addition of hot molten raw lead bullion and skimming off the dross after the final addition and cooling, to yield a bullion of de-copperised lead.

Said vessel is preferably a conventional cast iron or steel drossing kettle provided with a removable and adjustable mechanical stirrer and mounted in a setting through which air may be blown for cooling, or hot products of combustion from a burner or burners may be passed for heating.

The de-copperised lead bullion initially contained in a vessel is preferably at a temperature, around 330° C., slightly above its freezing point and the quantity of this bullion is preferably not less than twice the quantity of hot molten raw bullion which is first passed into the vessel, so as to ensure that the temperature of the mixed bullion does not exceed 600° C.

The material containing an element or elements which can combine with copper as a compound or compounds may be elemental sulphur in granular form and/or lead bullion rich in arsenic and/or antimony content. When an antimony-rich lead is used this may be added to the bullion either before or after the addition of hot raw bullion, but when using this antimony as the reagent for precipitating the copper in the bullion it is advantageous to maintain the concentration of antimony in the mixture at a level significantly greater than that required to combine with the copper.

Immediately after pouring hot molten raw bullion into the kettle and then stirring into the bullion a quantity of the said material, air may be blown through the setting for cooling while the stirrer is maintained in operation. During the next hour or so, whilst waiting for a further supply of hot raw bullion, the contents of the kettle will cool. If the kettle is relatively large compared with the rate of bullion production, the cooling by convection of the kettle, hour by hour, may be sufficient to ensure that at no time does the temperature of the bullion in the kettle exceed 600° C. If the rate of bullion production is such that adequate cooling of the kettle by convection alone during the intervals between the addition of hot raw bullion is not possible, additional cooling of the bullion in the kettle may be achieved by adding to the contents of the kettle a quantity of cold solid lead bullion, which will melt and mix with the bullion in the kettle. This is particularly advantageous if the cold solid lead bullion should be rich in antimony.

After each addition and mixing of said material, copper in the bullion will combine with an element or elements in the material to form a copper compound or compounds and during the subsequent cooling period said copper compound or compounds will separate in a dross which floats at the surface of the bullion. When the kettle has been filled with bullion to its working capacity and after stirring in the final addition of said material the contents of the kettle may be allowed to cool to about 400° C. or lower. A quantity of sawdust or like material may then be added and stirred into the contents of the kettle until the dross at the surface becomes dry. The mechanical stirrer may then be removed and the dross skimmed from the bullion by conventional means. The remaining de-copperised bullion may then be heated to a suitable temperature by passing hot products of combustion through the setting of the kettle and most of the hot bullion in the kettle preferably pumped to another drossing kettle where it is further decopperised by adding and stirring in powdered sulphur at a temperature just above the freezing point of the bullion. Alternatively, most of the hot bullion in the kettle can be run off and cast into pigs.

Some of the de-copperised bullion in the kettle may be allowed to remain and be cooled to about 330° C., so forming the predetermined quantity of de-copperised bullion contained in the kettle prior to the first addition of a predetermined quantity of hot molten raw bullion in a repeat cycle of operations.

For dealing with a substantially continuous flow of raw bullion from the primary producer, e.g. a blast furnace or reverbatory furnace, two or more drossing kettles will be required. When the working capacity of a kettle is more than 8 times the hourly rate of bullion production two kettles will be adequate. When the working capacity of a kettle is less than 6 times the hourly rate of production three kettles will normally be required.

When dealing with a raw bullion containing between 4% and 6% by weight of copper, 0.2% of sulphur, 0.2% of arsenic and less than 1% of antimony, powdered sulphur is a preferred material for periodically stirring into the bullion in the kettle. When the raw bullion contains more than 1.5% of antimony and the same content as above of the other impurities, a lead bullion rich in antimony is an alternative material for periodically stirring into the bullion in the kettle.

When using antimony-rich lead as the said material the dross which is obtained will be rich in copper and antimony. This dross can be charged to a suitable furnace, e.g. a reverbatory furnace, and reacted with galena and scrap iron to yield a matte containing copper, lead and iron and a lead bullion rich in antimony. This antimony-rich lead bullion would be cast in moulds and allowed to solidify and so provide pieces of antimony-rich lead as the said material. The matte will also contain some antimony so that for a self sufficient process of de-copperising with recycling of antimony-rich lead to operate successfully it is essential that there should be enough antimony present in the raw bullion to allow for losses of antimony in the matte and still leave sufficient antimony in solution in the de-copperised bullion to ensure that copper did not separate as a colloidal suspension of metallic copper. Where there is a deficiency of antimony in the raw bullion it will be necessary to add powdered sulphur supplementary to the addition of antimony-rich lead.

The process of the invention as illustrated by but not limited to the following examples:

EXAMPLE 1

Bullion of the approximate composition:

| | Percent |
|---|---|
| Lead | 94.2 |
| Copper | 4.4 |
| Sulphur | 0.2 |
| Arsenic | 0.2 |
| Antimony | 0.3 |
| Others | 0.7 | is produced at an average rate of 4 tons/hr. from a blast furnace, and is delivered at intervals of 1½ hours in quantities of approximately 6 tons in weight. The bullion is carried in brick lined steel ladles and is at a temperature of approximately 950° to 1,000° C.

Three kettles, two with a working capacity of 25 tons and one with a working capacity of 75 tons are available, together with suitable variable speed stirrers and electric motor driven pumps. The stirrer provided for the largest kettle, has the facility for the raising or lowering of the impeller in accordance with the quantity of lead bullion contained in the kettle.

At the start of a cycle of operations, approximately 50 tons of bullion at a temperature of 330–350° C. is retained in the 75 tons kettle and at intervals of 1½ hours, quantities of about 6 tons of the copper-rich raw bullion, the temperature of which is of the order of 950° C. are poured into the bullion already contained in the kettle. During the pouring in of the hot raw bullion, the bullion already in the kettle is stirred vigorously so as to create a strong vortex, and enough powdered sulphur is added to the vortex, to react with the copper contained in the hot copper rich bullion together with any excess of sulphur required to cover for losses by vaporisation and combustion. The position of the stirrer must be set initially in the optimum position for efficient mixing and the creation of a vortex when only 50 tons of bullion are in the kettle but after the addition of each batch of hot raw bullion, the position of the stirrer must be raised in order to maintain efficient mixing.

The solubility of copper in bullion already saturated with sulphur at 350° C., is approximately 0.06% and the solubility of sulphur is about 0.001% so that the amount of copper in solution in the 50 tons of bullion already in the kettle at the start of the cycle of operations is 0.03 ton and the amount of dissolved sulphur is 0.0005 ton.

The addition of the first 6 tons of hot bullion temporarily raises the temperature of the mixture to between 410 and 430° C., the actual temperature reached will be dependent to some extent on the proportions of impurities present in the bullion. At 430° C. the maximum solubility of copper in bullion is about 0.2% corresponding to 0.11 ton in 56 tons of bullion so that since approximately 0.26 ton of copper is added in the 6 tons of hot raw bullion, then approximately 0.18 ton of the added copper would precipitate as metallic copper if no sulphur should be added. The addition of sulphur during the pouring of the hot raw bullion will convert this copper to copper sulphide, and in addition as the bullion becomes saturated with sulphur then the solubility of copper is 430° C. falls to approximately 0.1% so that the copper remaining in solution is only 0.056 ton and the total copper precipitated as sulphide becomes approximately 0.24 ton.

The rate of cooling of a full kettle of 75 tons working capacity together with its brick setting is of the order of 25° C. per hour under conditions of natural convection, when the mass is at a temperature of approximately 400° C. If air be blown through the setting the rate of cooling can be increased to about 40° C. per hour so that by the time the next batch of bullion is ready to be poured after an interval of approximately 1½ hours the temperature of the kettle and the bullion will have fallen to about 345° C. to 365° C. On repeating the operation of pouring in hot bullion and adding more sulphur, the temperature of the mixture of hot bullion and partially de-copperised bullion will rise to between 415 and 435° C. and then cool to between 355° and 375° C. After adding four batches of raw bullion to the kettle, corresponding to a total addition of 24 tons of hot raw bullion, the temperature of the bullion in the kettle will be between 420° and 440° C.

After completing the addition of the necessary sulphur, amounting to between 750 and 800 pounds in batches of approximately 200 pounds, nearly all of the copper insoluble at the actual temperature of the mixture, will have separated as copper sulphide with only a small proportion present as copper arsenide and copper antimonide. The dross which separates must next be dried by stirring in an adequate amount of sawdust or other suitable known drying reagent and the whole must be stirred until the dross is substantially dry or free from entrained lead. Most of the dross which separates is then removed quickly, but no attempt is made to remove everything and the quantity removed will be about 5 tons containing from 20 to 22% by weight of copper.

The stirrer must then be replaced by a pump and 25 tons of partially de-copperised bullion, the temperature of which will be between 390° and 410° C. is pumped into one of the smaller kettles of 25 ton working capacity, where final de-copperising is done in the conventional manner by stirring in an excess of sulphur after the bullion has been allowed to cool to the temperature at which the bullion freezes.

The removal of dross from the partially de-copperised bullion in the larger kettle, together with the pumping out of 25 tons of partially de-copperised bullion into the smaller kettle, leaves approximately 44 tons of partially de-copperised bullion in the larger kettle, and it will be at a temperature between 380 and 400° C. To this bullion is then added 6 tons of cold solid de-copperised bullion together with any sulphur dross (a mixture of lead sulphide, lead oxide, and copper sulphide), containing about 7% of copper, from the previous final de-copperised in one of the smaller kettles. The quantity of sulphur dross is approximately 0.3 ton and together with the 6 tons of cold solid bullion, the temperature of the partially de-copperised bullion remaining in the larger kettle is reduced to between 330 and 350° C. and the cycle of operations of de-copperising is begun again.

An appropriate schedule of operation is given below:

| Time in hours: | Bullion in kettle tons | Added bullion, tons | Added sulphur, lbs. | Temp. of Mixture °C |
|---|---|---|---|---|
| 0.0 | 50 | | | 330–350 |
| 0.15 | 56 | 6 | 200 | 410–430 |
| 1.30 | 56 | | | 345–365 |
| 1.45 | 62 | 6 | 200 | 415–534 |
| 3.00 | 62 | | | 355–375 |
| 3.15 | 68 | 6 | 200 | 420–440 |
| 4.30 | 68 | | | 370–390 |
| 4.45 | 74 | 6 | 200 | 420–440 |

Add sawdust and stir until the dross is dry, remove about 5 tons of dross and pump 25 tons to the final de-copperising kettle. This will leave behind at about 5.45 hours, 45 tons of bullion at 390 to 410° C. To this add 6 tons of cold solid bullion and the sulphur drosses from the final de-copperising so that at 6.00 hours there is 50 tons of partially de-copperised bullion remaining in the kettle at a temperature of 330 to 350° C.

The copper-rich drosses arising from the above operations will be treated to render them commercially valuable, for example by reduction with coal in a suitable furnace for the production of copper matte and the recovery of bullion which would be recycled to the process or alternatively they could be roasted in air and the product resulting from roasting extracted with sulphuric acid and the copper recovered electrolytically. The oxidised residues consisting mainly of litharge could then be reduced with coal in a suitable furnace and the bullion recovered and recycled to the de-copperising system.

EXAMPLE 2

Bullion of the approximate composition:

| | Percent |
|---|---|
| Lead | 91.7 |
| Copper | 5.6 |
| Sulphur | 0.2 |
| Arsenic | 0.2 |
| Antimony | 1.6 |
| Others | 0.7 | is produced at an average rate of 3 tons/hr. from a blast furnace and is delivered at intervals of 2 hours in quantities of approximately 6 tons at a temperature of approximately 950° C. to 1,000° C.

The same equipment referred to in Example 1 is available for the de-copperising operations.

At the start of a cycle of operations approximately 44 tons of partially de-copperised bullion at a temperature of 400° C. is present in the kettle. To this is added 7 tons of antimonial lead (15% antimony) which has been previously recovered from the copper dross recovered during earlier operations. This 7 tons in solid form is added immediately before pouring in 6 tons of hot raw bullion. The melting of the cold bullion together with the addition of the hot bullion results in the mixed bullion attaining a temperature of about 405 to 415° C. During the next two hours, whilst waiting for the next charge of hot bullion, the rate of cooling of the kettle is restricted, either by limiting the amount of cold air blown through the brick setting of the kettle or by actually applying heat to the kettle. Just before adding the next 6 tons of hot bullion, 6 tons of cold solid de-copperised bullion is added and again the temperature of the mixture will remain at approximately 400–420° C. During the next two hours the kettle is allowed to cool so that on adding the third batch of hot raw bullion (6 tons) the temperature again reaches approximately 400° C.

During the operations referred to above the bullion in the kettle is stirred gently so as to avoid the formation of a vortex and thus minimising the extent to which the bullion is oxidised.

After mixing the bullion in the kettle, dross may be removed and its lead content reduced by means of a centrifuge supported immediately above the kettle. Alternatively, the dross may be dried by stirring in sawdust or other drying agent in accordance with normal practice.

After removing dross, which will be approximately 6 tons in weight, and contain about 1.1 ton of copper and an equal weight of antimony, 25 tons of partially de-copperised bullion is pumped into one of the smaller kettles and the final de-copperising of this bullion is done in the conventional manner by stirring in powdered sulphur at or near to the freezing temperature of the bullion. There will remain behind in the larger kettle approximately 44 tons of partially de-copperised bullion at a temperature of approximately 400° C., and the cycle of operations of de-copperising hot copper-rich bullion can start again.

The antimonial dross from the larger kettle and the sulphur dross from the final de-copperising kettle are mixed together and treated batch-wise in a reverberatory furnace together with suitable materials. The latter comprise galena to provide sulphur, a reducing agent such as coal or charcoal, iron for the upgrading of matte and precipitation of lead and antimony and suitable fluxes such as sand to flux any slag forming reagents. By this treatment an antimonial lead containing about 15% antimony is recovered for re-use in the de-copperising process, together with an iron copper lead matte suitable for sale. There will also be slag.

When treating 72 tons of bullion of the composition already given above and in the manner described, the material balance will be substantially as shown below:

| Material | Mass/day, tons | Principal constituents percent | | | |
|---|---|---|---|---|---|
| | | Lead | Copper | Antimony | Others |
| Raw bullion | 72 | 91.7 | 5.6 | 1.6 | 1.1 |
| Recycle antimonial bullion | 26–28 | 82.3 | 1.9 | 15.2 | 0.6 |
| Dilution or cooling bullion | 24–22 | 98.8 | <0.02 | 1.1 | <0.08 |
| Antimonial dross | 24 | 59.4 | 18.4 | 18.4 | 3.8 |
| Sulphus dross | 2 | 87.0 | 7.3 | 0.9 | 4.8 |
| Matte and slag | 9–10 | 16.5 | 44.3 | 3.5 | 35.7 |
| Galena and fluxes used | 10–12 | 76.0 | 0.4 | 0.5 | 23.1 |
| Final decopperised bullion | 73 | 98.8 | <.02 | 1.1 | <.08 |

EXAMPLE 3

When the copper and antimony contents of the raw bullion are intermediate between the values quoted above in Example 1 and Example 2, then the method of operation is adjusted to combine the effects of the addition of both sulphur and antimony. It has been calculated that when antimony is less than about ¼ the weight of the copper content of the hot raw bullion there will be insufficient antimony to allow for recycle of antimonial bullion and at the same time cover antimony losses associated with the making of copper matte and also in the slag associated with the copper matte. Consequently a supply of antimony must be obtained from an outside source or alternatively sulphur must be used in a manner to make up for the deficiency in antimony.

The recovery for antimony for recycling is not limited to the making of iron/copper/lead matte, but any known method such as roasting the dross, extracting the copper with sulphuric acid and then reducing the antimony and lead oxides whereby antimonial lead may be recovered, may be employed.

I claim:

1. In a process for de-copperising raw lead bullion containing between 4% and 6% by weight of copper, about 0.2% by weight of sulphur, about 0.2% by weight of arsenic and more than 1.5% by weight of antimony, the steps which comprise providing said raw lead bullion in a molten state, mixing together in a vessel a quantity of said molten raw lead bullion, a quantity of de-copperised lead bullion and a quantity of an antimony-rich lead, effecting cooling of the mixed bullion, then periodically adding further predetermined quantities of said hot molten raw bullion to said vessel to mix with the bullion contained therein until the vessel is full to its working capacity, with each such addition adding to and mixing with the bullion contained in the vessel a further quantity of antimony-rich lead, effecting cooling of the mixed bullion before the next addition of hot molten raw lead bullion and skimming off any dross present on the surface of the bullion after the final addition and cooling, to yield a bullion of de-copperised lead.

2. In a process for de-copperising lead of a relatively high copper content, the steps which comprise mixing a first quantity of hot molten raw lead bullion with a quantity of de-copperised lead bullion contained in a vessel, adding to and mixing with the bullion contained in said vessel an antimony-rich lead, effecting cooling of the mixed bullion, then periodically adding further quantities of hot molten raw bullion to said vessel to mix with the bullion contained therein until the vessel is full to its working capacity, with each such addition adding to and mixing with the bullion contained in said vessel an antimony-rich lead, effecting cooling of the mixed bullion before the next addition of hot molten raw lead bullion, after the final addition and cooling skimming off the dross formed on the surface of the bullion to yield a bullion of de-copperised lead, reacting said dross with galena and scrap iron to yield a matte containing copper, lead and iron and an antimony-rich lead bullion, cooling said de-copperised lead bullion and removing a portion of said de-copperised lead bullion from said vessel, the remaining portion of said de-copperised lead bullion contained in the vessel forming said quantity of de-copperised lead bullion to be mixed with the next first quantity of hot molten raw lead bullion, and repeating said sequential steps, said antimony-rich lead bullion obtained from said dross forming said antimony-rich lead for adding to and mixing with the bullion contained in the vessel.

References Cited

UNITED STATES PATENTS

| | | | |
|---|---|---|---|
| 1,285,714 | 11/1918 | Hulst | 75—78 |
| 1,386,503 | 8/1921 | Hulst et al. | 75—78 |
| 1,583,495 | 5/1926 | Schleicher | 75—78 |
| 1,891,978 | 12/1932 | Gross et al. | 75—78 |
| 1,957,930 | 5/1934 | Behr | 75—78 |
| 2,217,981 | 10/1940 | Hallows | 75—78 |
| 3,260,592 | 7/1966 | Davey et al. | 75—78 |
| 3,317,311 | 5/1967 | Davey | 75—78 |

FOREIGN PATENTS

| | | |
|---|---|---|
| 248,694 | 12/1963 | Australia. |
| 925,822 | 5/1963 | Great Britain. |

L. DEWAYNE RUTLEDGE, Primary Examiner

HENRY W. TARRING II, Assistant Examiner